United States Patent
Subbiah et al.

(12)

(10) Patent No.: US 6,289,016 B1
(45) Date of Patent: Sep. 11, 2001

(54) METHOD FOR ELIMINATING MISCONCATENATION OF PARTIAL PACKETS IN AAL2 AND PARTIAL PACKET WITH CHANNEL IDENTIFIER

(75) Inventors: Baranitharan Subbiah, Chelmsford; Sudhir Dixit, Norwood, both of MA (US)

(73) Assignee: Nokia Telecommunications, Oyc., Espoo (FI)

( * ) Notice: Subject to any disclaimer, the term of this patent is extended or adjusted under 35 U.S.C. 154(b) by 0 days.

(21) Appl. No.: 09/082,176

(22) Filed: May 20, 1998

(51) Int. Cl.[7] ........................................................ H04J 3/24

(52) U.S. Cl. ........................... 370/395; 370/235; 370/392; 370/394; 370/470

(58) Field of Search ........................................ 370/230, 248, 370/340, 389, 394, 395, 396, 397, 465, 466, 474, 229, 235, 392, 401, 470, 472

(56) References Cited

U.S. PATENT DOCUMENTS

| | | | |
|---|---|---|---|
| 5,953,339 | * | 9/1999 | Baldwin et al. ........................ 370/397 |
| 6,038,231 | * | 3/2000 | Dolby et al. ........................... 370/394 |
| 6,041,054 | * | 3/2000 | Westberg ............................... 370/389 |
| 6,049,530 | * | 4/2000 | Petersen et al. ....................... 370/394 |
| 6,075,798 | * | 6/2000 | Lyons et al. ........................... 370/465 |
| 6,154,450 | * | 11/2000 | Wallentin et al. .................... 370/340 |

FOREIGN PATENT DOCUMENTS

| | | | |
|---|---|---|---|
| WO 96/34478 | 10/1996 | (WO) | ............................. H04L/12/56 |
| WO 97/38550 | 10/1997 | (WO) | ............................. H04Q/11/04 |

OTHER PUBLICATIONS

K. Nagata et al., "Evalutaiton of AAL–2 for Low–Bit–Rate ATM Voice Communiations," NTT Revew, Services & Systems, pp. 72–80 (1998).

* cited by examiner

Primary Examiner—Douglas Olms
Assistant Examiner—Shick Hom
(74) Attorney, Agent, or Firm—Altera Law Group, LLC

(57) ABSTRACT

A method and data structure for preventing the misconcatenation of partial packets when an even number of packets are lost over the network. A channel identifier code is added to the head of a remainder partial packet to allow the remainder partial packet to reassembled with a prior partial packet having the same channel identifier code. The method includes the steps of determining whether each packet will be divided into a first partial packet and a remainder partial packet at an ATM cell boundary, adding a CID at the beginning of each remainder partial packet, assembling the first and remainder partial packets into ATM cells, transmitting the ATM cells, receiving the ATM cells, verifying whether a first partial packet and a remainder partial packet in the received ATM cells have the same CID and assembling the first partial packet and the remainder partial packet into a single packet when the CIDs match. The method may also includes the steps of discarding the first and remainder partial packets when the CIDs do not match or sending the first partial packet to a user identified by the CID for the first partial packet and the remainder partial packet to a user identified by the CID for the remainder partial packet. The CID comprises a one byte code. The data structure for the ATM cell includes a header and a payload assembled to the header, the payload comprising at least one packet, wherein the at least one packet comprises a remainder partial packet having a channel identifier code attached thereto to identify the user for the remainder partial packet.

14 Claims, 6 Drawing Sheets

METHOD FOR ELIMINATING MISCONCATENATION OF PARTIAL PACKETS IN AAL2 AND PARTIAL PACKET WITH CHANNEL IDENTIFIER

BACKGROUND OF THE INVENTION

1. Field of the Invention

This invention relates in general to networks using the ATM Adaptation Layer 2 protocol, and more particularly to a method for eliminating misconcatenation in AAL2.

2. Description of Related Art

ATM has been selected as a world standard for broadband ISDN in network communication systems. ATM systems have been implemented on a global basis and developed in a rapid growth. ATM technology is destined to play a major role in both public and private broadband networks. AAL2 is one of the four types of AAL (ATM Adaptive Layer) protocols which have been recommended by CCITT (now ITU-T), namely AAL1, AAL2, AAL3/4 and AAL5. In general, the layer services provided by AAL1 are constant bit rate (CBR) services which require information to be transferred between source and destination at a constant bit rate. AAL2 offers a transfer of information with a variable bit rate. In addition, timing information is transferred between source and destination. Since the source is generating a variable bit rate, it is possible that cells are not completely filled and that filling level varies from cell to cell. AAL3/4 is used for transfer of data which is sensitive to loss, but not sensitive to delay. The AAL3/4 protocol may be used for connection oriented as well as for connectionless data communication. AAL3/4 itself does not perform all functions required by a connectionless service, since functions like routing and network addressing are performed on the network layer. AAL5 is designed to offer a service with less overhead and better error detection below the common part of the convergence sublayer (CPCS).

The AAL2 signaling protocol describes methods by which a switched AAL2 connection can be established between two AAL2 end users across a network that consists of both ATM and AAL2 switches. The current activities in the Study Group 11-WP1/Q6 or ITU-T is focused on specifying the requirements for such a signaling protocol. The important function of AAL2 signaling protocol is to establish an AAL2 connection between two AAL2 end points on a concatenation of ATM Virtual Channel Connections (VCCs) that are either on demand (SVC) or semi-permanent (PVC). Some the basic requirements of AAL2 signaling protocol include the ability to establish an AAL2 connection between AAL2 end systems that support AESA formats, the ability to support hop-by-hop routing mechanism between AAL2 end systems, the ability to indicate any failures to corresponding management entity, and the ability to setup AAL2 connections with different QoS requirements.

In AAL2, packets (minicells) from many users are assembled into a single ATM cell and transmitted on the same ATM connection. In addition, packets are allowed to straddle across ATM cell boundary to maximize the bandwidth utilization. A single bit sequence number is defined in the CPS-PDU header to detect cell losses at the receiver. But, an even number of cell losses will render the sequence bit inadequate and resulting in misconcatenation of packets. The CPS-PDU header includes a length indicator, which can be used to identify the problem when the payload size does not match its value. If the size of the remainder of the payload of a packet matches the size of the partial packet encapsulated in an ATM cell that arrives after an even number of cell losses, then partial packets from two different users are misconcatenated and sent to the user whose CID was received in the previous partial packet. In traditional applications, misconcatenation is generally not a serious problem in other types of networks since all the information, albeit erroneous, belongs to the same user with the exception of a few bytes missing at random. Elimination of misconcatenation can be important in AAL2 since data belonging to one user is delivered to another user resulting in security violation and application malfunction.

Delay sensitive applications such as speech and interactive video can not afford re-transmission and checksum verification due to overhead and additional delays. In such cases, misconcatenation can cause application malfunction at the receiver. In addition, the misconcatenation of signaling and management information sent through AAL2 can lead to network breakdown.

To solve the problem of misconcatenation, a check sum (5 bit CRC) at the UUI field of the CPS-Packet header could be used. The User-to-User Information (UUI) field in the CPS-Packet is allocated for carrying CPS-Packet sequence number and other peer to peer control information. However, this field can be used for checksum when it is not used for any other purpose. Nevertheless, this scheme is complex in an AAL2 switching environment since packets are unpacked and packed at intermediate nodes more often than in a point-to-point AAL2 connection. The chance of a packet being split across cell boundary increases considerably in an AAL2 switching network. In order to safeguard the UUI information, intermediate nodes have to extract UUI and send it separately. which requires additional bookkeeping and signaling.

Another method to solve the problem is to use the CLP bit in the ATM cells to identify the problem. However, this solution has the limitation that it can only solve the problem of consecutive cell loss. By tracking the partial packets (4 cells) during the cell assembly process at the transmitter, the critical cell (cell 3) can be tagged to guarantee that the network will deliver the critical cell to the receiver. However, this method also requires additional variables and modification in the current CLP handling procedures in the ATM switch.

It can be seen that there is a need for a method for eliminating misconcatenation in AAL2 that is simple and which does not require additional variables or modification of current CLP handling procedures.

SUMMARY OF THE INVENTION

To overcome the limitations in the prior art described above, and to overcome other limitations that will become apparent upon reading and understanding the present specification, the present invention discloses a method and data structure for preventing the misconcatenation of partial packets when an even number of packets are lost over the network.

The present invention solves the above-described problems by providing a channel identifier code to the head of a remainder partial packet to allow the remainder partial packet to reassembled with a prior partial packet having the same channel identifier code.

A method in accordance with the principles of the present invention includes the steps of determining whether each packet will be divided into a first partial packet and a remainder partial packet at an ATM cell boundary, adding a CID at the beginning of each remainder partial packet, assembling the first and remainder partial packets into ATM cells, transmitting the ATM cells, receiving the ATM cells, verifying whether a first partial packet and a remainder partial packet in the received ATM cells have the same CID and assembling the first partial packet and the remainder partial packet into a single packet when the CIDs match.

Other embodiments of a system in accordance with the principles of the invention may include alternative or optional additional aspects. One such aspect of the present invention is that the method further includes the step of discarding the first and remainder partial packets when the CIDs do not match.

Another aspect of the present invention is that the method further includes the step of sending the first partial packet to a user identified by the CID for the first partial packet and the remainder partial packet to a user identified by the CID for the remainder partial packet.

Another aspect of the present invention is that the CID comprises a one byte code.

Another aspect of the present invention is that a data structure for an ATM cell is provided, wherein the ATM cell includes a header and a payload assembled to the header, the payload comprising at least one packet, wherein the at least one packet comprises a remainder partial packet having a channel identifier code attached thereto to identify the user for the remainder partial packet.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding arts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method for eliminating misconcatenation in AAL2 due to an even number of cell losses in an ATM Adaptation Layer 2 (AAL2) environment. The single bit sequence number in the CPS-PDU header can detect a single or odd number of ATM cell losses, but it is inadequate in the event of an even number of ATM cell losses. The length indicator field in the CPS-Packet header can identify the misconcatenation problem only when the packet payload size does not match its value. The present invention protects a packet (minicell) straddled across an ATM cell boundary by using a single octet Channel IDentifier (CID). The CIDs of partial packets are verified before assembling into a single packet at the receiver, which prevents a packet from one user to be incorrectly delivered to another user.

Figure 1:
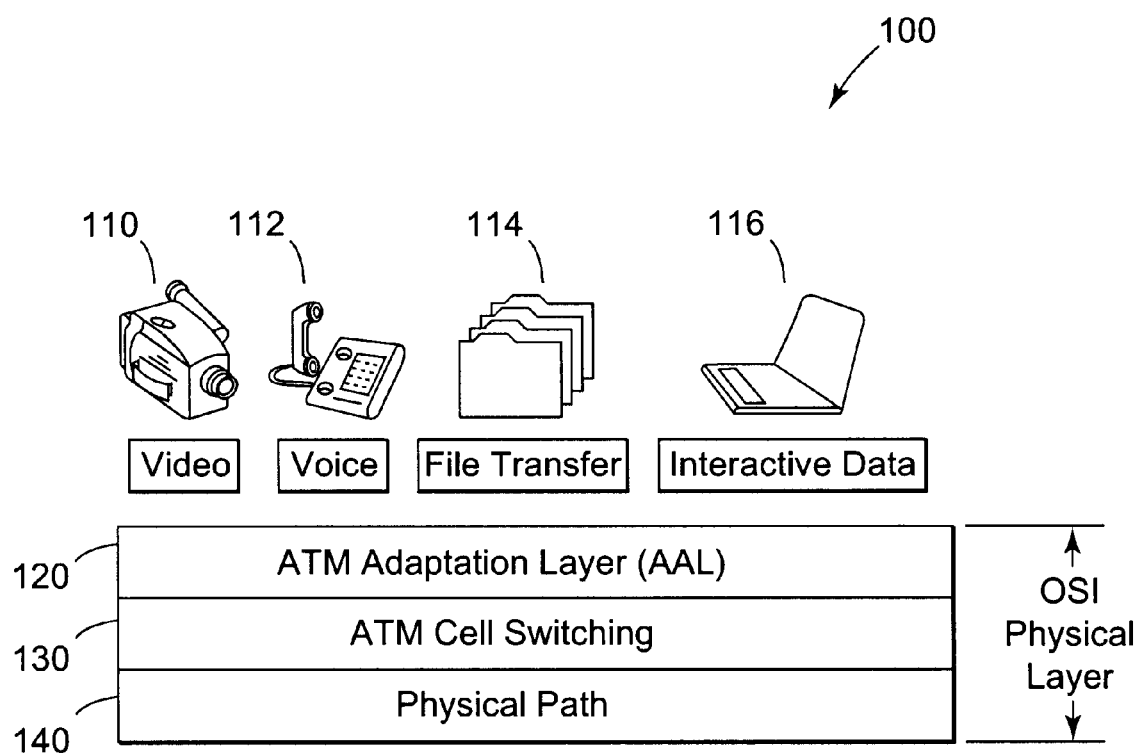
FIG. 1 illustrates the Open Systems Interconnection (OSI) physical layer.

FIG. 1 illustrates the Open Systems Interconnection (OSI) physical layer 100. Modern networks must handle multiple types of traffic such as video 110, voice 112, data files 114, and interactive data 116. The ATM Adaptation Layer 120 is a collection of standardized protocols that provide services to higher layers by adapting user traffic to a cell format. The AAL 120 is divided into the Convergence Sublayer (CS) and the Segmentation and Reassembly (SAR) sublayer (not shown). The ATM Layer 130 is the second layer of the ATM protocol stack model 100 that constructs and processes the ATM cells. The functions of the ATM layer 130 also include Usage Parameter Control (UPC) and support of Quality of Service (QoS) classes. Finally, the physical layer 140 is the bottom layer of the ATM protocol reference model 100. The physical layer 140 is subdivided into two sublayers, the Transmission Convergence (TC) and the Physical Medium (PM) (also not shown). The physical layer 140 provides the ATM cells transmitted over the physical interfaces that interconnect ATM devices.

AAL2 is the new ITU-T specification for supporting low bit rate and delay sensitive applications such as mobile telephony in an ATM environment. AAL2 allows many users to share a single ATM connection by effectively packing variable size packets into ATM cells. AAL2 is subdivided into Service Specific Convergence Specific Layer (SSCS) and Common Parts sub-layer (CPS). The CPS layer approved by ITU-T in September 1997, enables variable size packets (0–64 bytes) from different users to be assembled in an ATM cell payload and transmitted on the same ATM Virtual Channel Connection (VCC). In addition, packets are allowed to straddle across an ATM cell boundary to maximize the bandwidth utilization.

Figure 2:
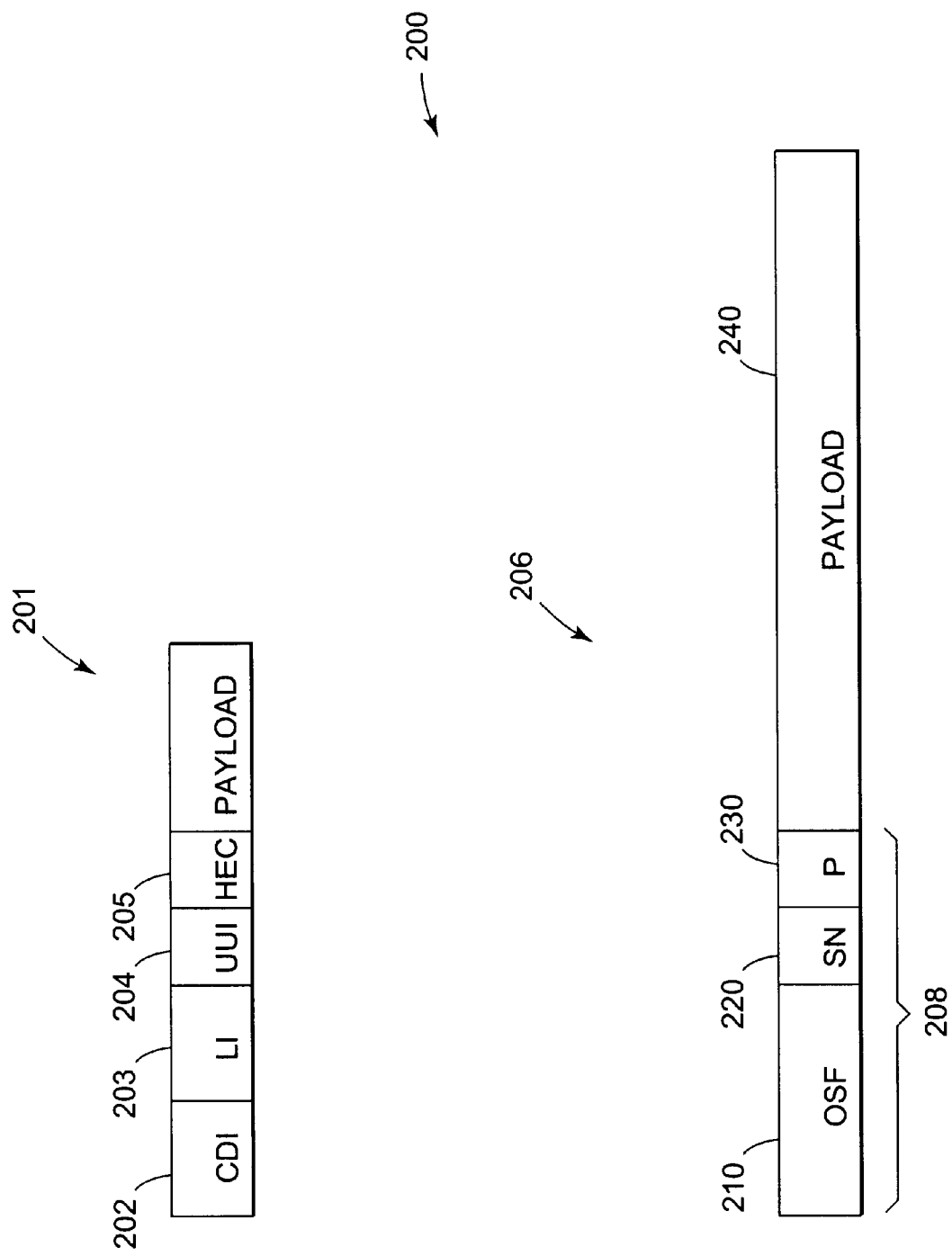
FIG. 2 illustrates the AAL2 packet formats.

FIG. 2 illustrates the AAL2 packet formats 200. In FIG. 2, a CPS-Packet header 201 is 3 bytes long. The CID field 202 is 8 bits long and identifies the LLC for the packet. The LI field 203 includes 6 bits and indicates the length of the LLC packet. When the LI field 203 points beyond the end of the current ATM cell, the packet is split between cells. The five bits of the User-To-User Indication Field 204 are identifying user to user information. The HEC field 205 includes 5 bits and provides error detection over the packet header.

Also shown in FIG. 2 is a typical Common Parts sublayer packet data unit (CPS-PDU) for AAL2 206. The CPS-PDU Start Field (STF) header 208 includes a six bit Offset Field (OSF) 210, a Sequence Number (SN) 220, and a parity bit 230. The STF 202 is one byte in length and occurs at the beginning of every ATM cell payload. As FIG. 2 shows, the Offset Field (OSF) 210 is 6 bits in length. The OSF 210 indicates the remaining length of the packet that (possibly) started in the preceding cell from this ATM connection and is continuing in the current cell. Thus, the OSF 210 points to the start of the first new packet and provides immediate recovery of the packet boundary after an event causing loss of packet delineation. The 1-bit sequence number (SN) field 220 provides a modulo-2 sequence numbering of cells. The one parity (P) bit 230 provides odd parity and covers the STF. Then, the payload 240 includes 47 bytes.

If an even number of cells are lost, the sequence number (SN) 220 bit is inadequate and a misconcatenation of packets results. Further, a length indicator does not prevent misconcatenation if the size of the remainder of the payload of a packet matches the size of the partial packet encapsulated in an ATM cell that arrives after an even number of cell losses. In this case, partial packets from two different users are misconcatenated and sent to the user whose CID was received in the previous partial packet. While misconcatenation is generally not a serious problem since all the information, albeit erroneous, belongs to the same user with the exception of a few bytes missing at random, the elimination of misconcatenation can be important in AAL2 since data belonging to one user is delivered to another user resulting in a security violation and application malfunction.

Figure 3:
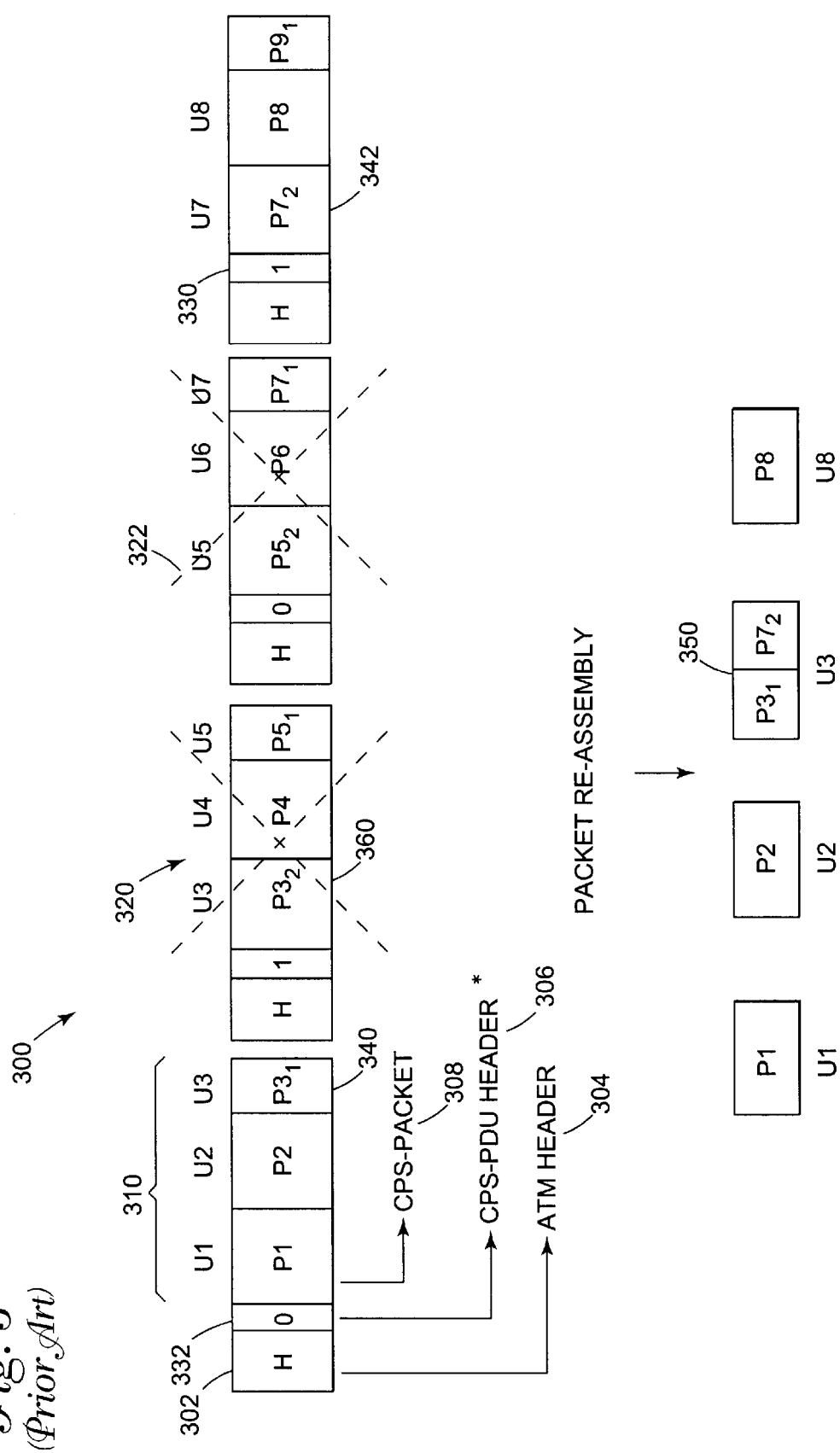
FIG. 3 illustrates a misconcatenation when two consecutive cell losses occur.

FIG. 3 illustrates misconcatenation when two consecutive cell losses occur 300. In FIG. 3, each cell 302 includes an ATM header 304, a CPS-PDU header 306 and at least one CPS-Packet 308 forming the cell payload 310. The example illustrated in FIG. 3 can easily be extended to any even number of cell losses. If the packets P1 through P8 belong to users U1 to U8, respectively, then after an even number of cell losses 320, 322, the receiver fails to recognize the loss since the single bit sequence number 330 follows the previously received CPS-PDUs sequence number 332. The receiver behaves as normal by extracting the CPS-PDUs from the ATM cells and inserting them into a packet re-assembly buffer. Thus the partial packets 340, 342 from users 3 and 7 are misconcatenated 350. This problem is detected at the receiver only when the length indicator in the CPS-Packet header 306 does not match the actual length of the misconcatenated packet 350. If the size of the partial packet $P3_2$ 360 matches the size of $P7_2$ 342, then information belonging to user 7 is delivered to user 3 since the CID of user 3 appears in the CPS-Packet header 306.

However, as mentioned above, delay sensitive applications such as speech and interactive video can not afford re-transmission and checksum verification due to overhead and additional delays. In such cases, misconcatenation can cause application malfunction at the receiver. In addition, the misconcatenation of signaling and management information sent through AAL2 can lead to network breakdown.

Figure 4:
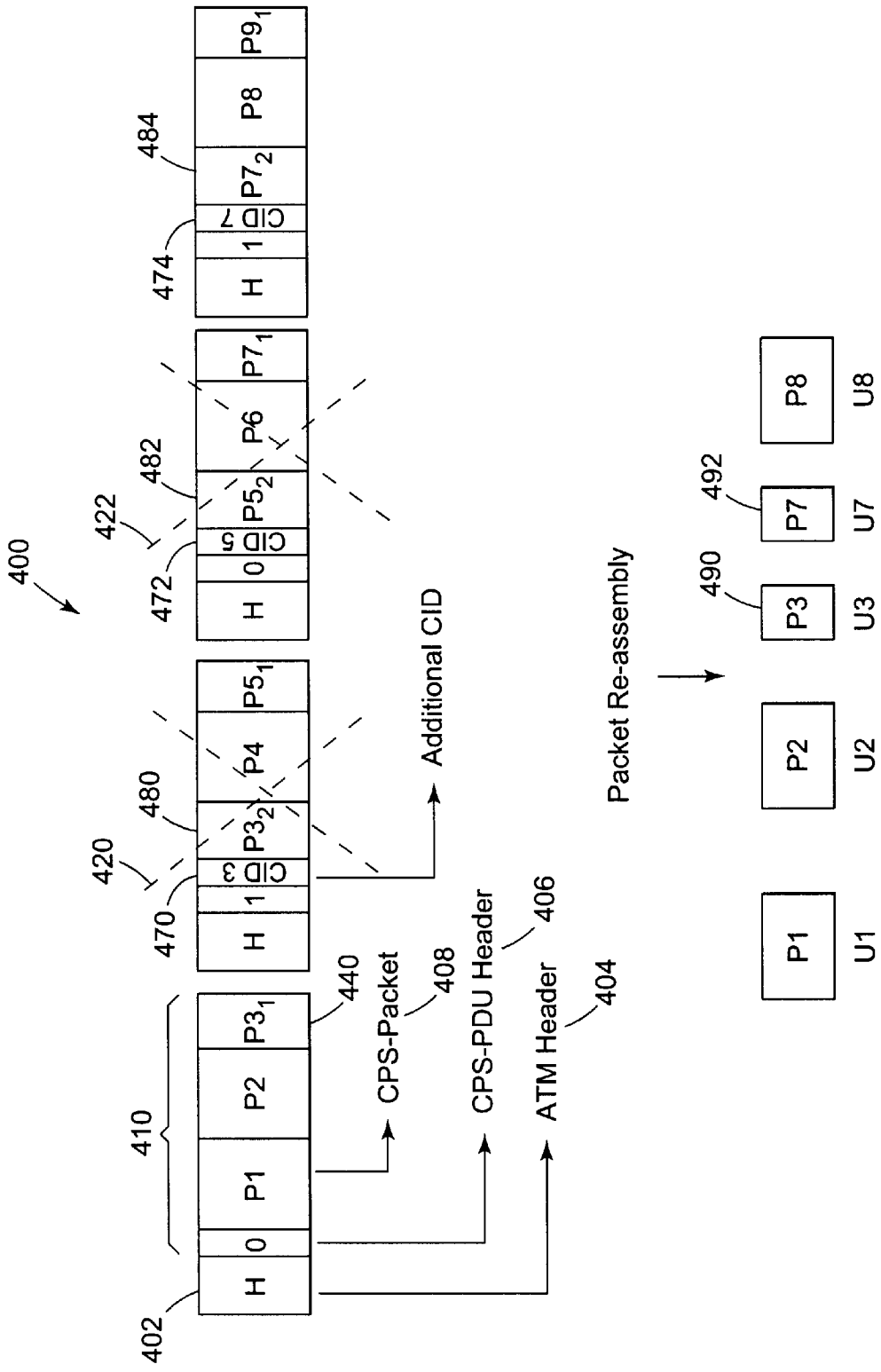
FIG. 4 illustrates a channel identifier-based algorithm to remove misconcatenation in AAL2 according to the present invention.

FIG. 4 illustrates the operation of a CID-based algorithm to remove misconcatenation in AAL2 500 according to the present invention. A single byte CID 470, 472, 474 is appended to the partial packets 480, 482, 484. During the cell assembly process, if a packet straddles across two consecutive ATM cells, then a single octet CID 470, 472, 474 is added at the beginning of the remainder packet 480, 482, 484 placed in a subsequent ATM cell. Two partial packets 440, 484 received on two different ATM cells are verified for the same CID before being assembled into a single packet. Due to this method, packets belonging to a user are protected from misconcatenation. After an even number of cell losses partial packet $P3_1$ 440, and $P7_2$ 484 are identified by the receiver as belonging to users 3 and 7 respectively. Based on the application, packets 490, 492, comprising partial packets $P3_1$ 440, and $P7_2$ 484 respectively, can either be discarded or sent to the upper layers.

Figure 5:
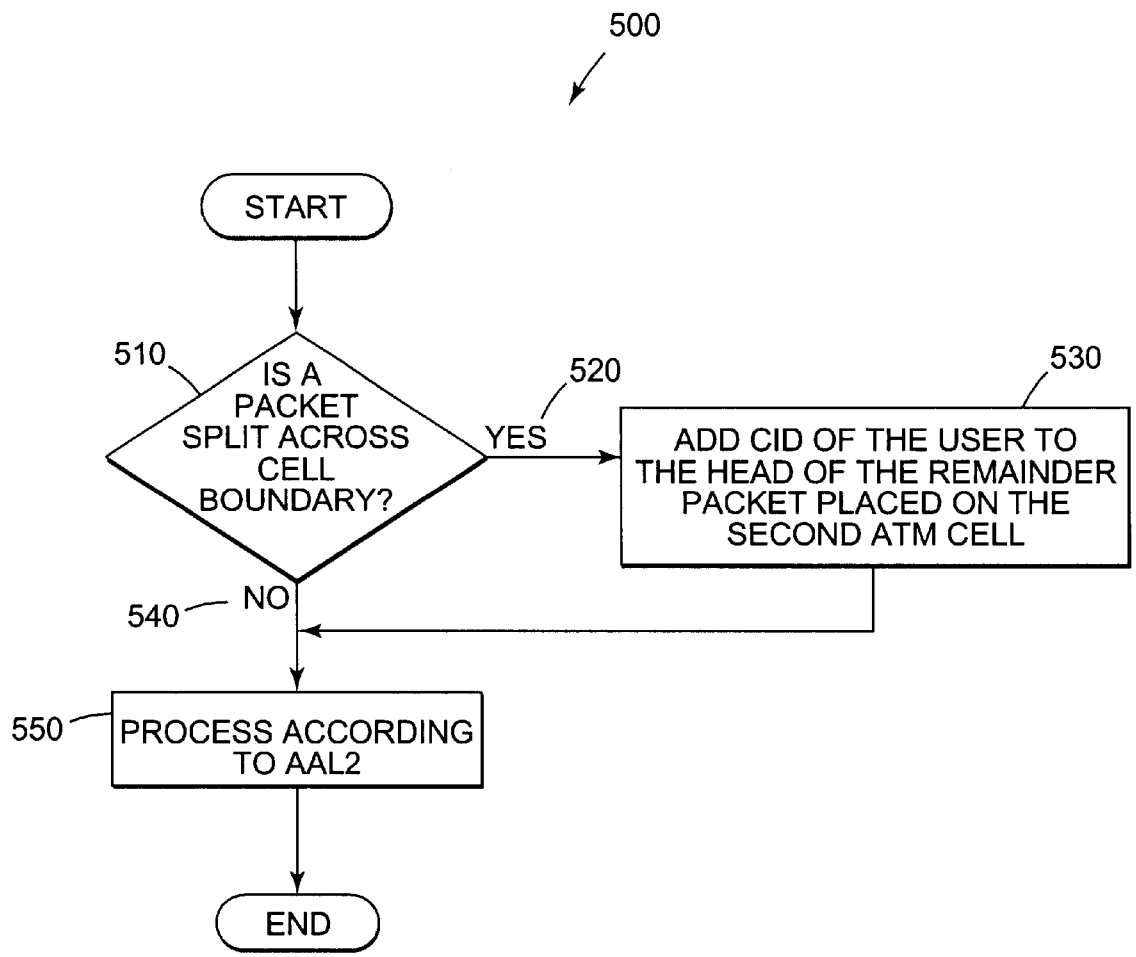
FIG. 5 illustrates a flow chart of the process that must be added to existing AAL2 functions at the transmitter.

The changes necessary in the AAL2 algorithm are minimal. FIG. 5 illustrates a flow chart 500 of the process that must be added to existing AAL2 functions at the transmitter. First, whether a packet is split across cell boundary must be determined 510. If a packet is not split across a cell boundary 540, then normal AAL2 processing is applied 550. However, if a packet is split across a cell boundary 520, then a CID of the user is added to the head of the remainder packet placed on the second ATM cell 530.

Figure 6:
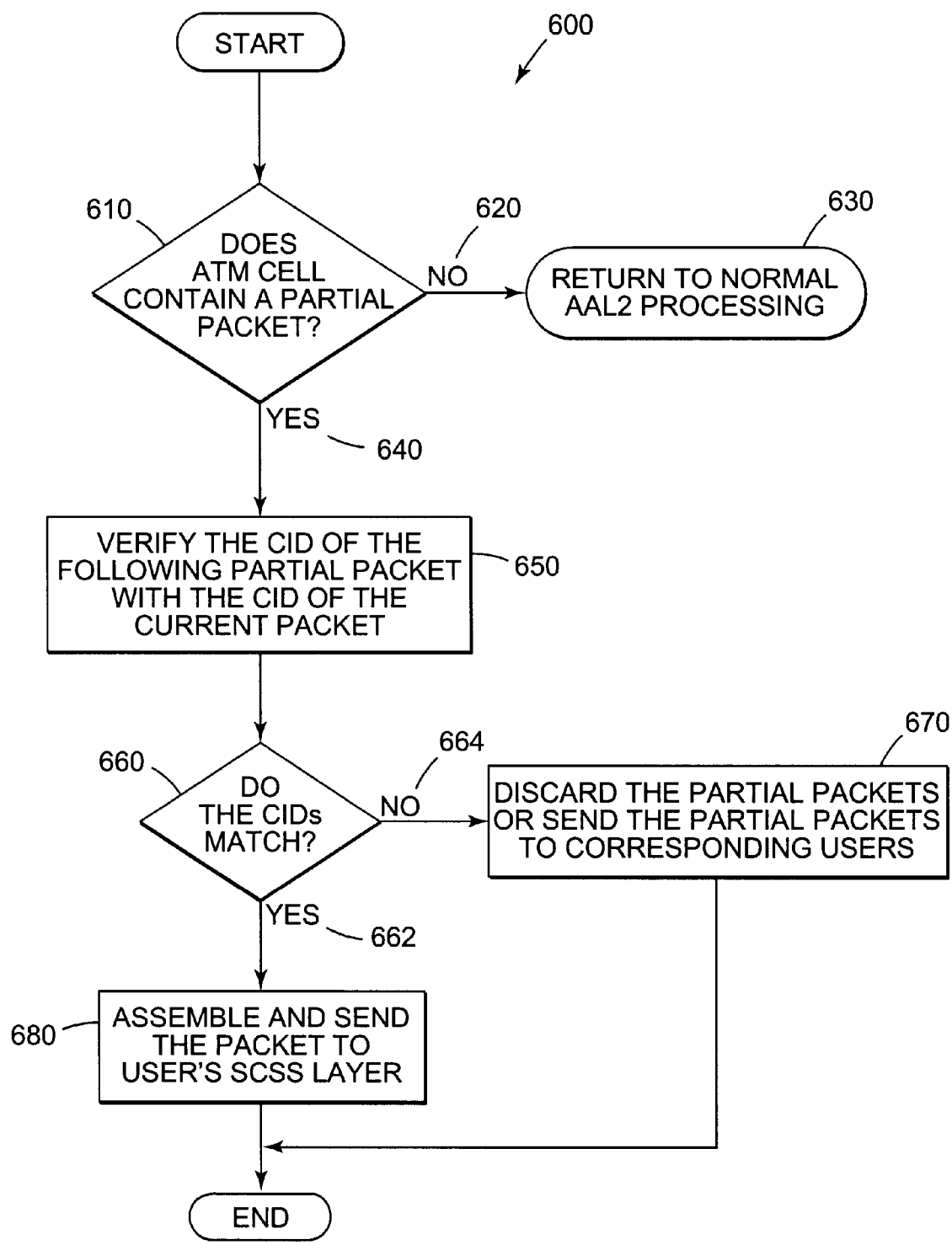
FIG. 6 illustrates a flow chart of the process that must be added to the existing AAL2 functions at the receiver module.

FIG. 6 illustrates a flow chart 600 of the process that must be added to the existing AAL2 functions at the receiver module. In FIG. 6, whether an ATM cell contains a partial packet is first verified 610. If the ATM cell does not contain a partial packet 620, then normal AAL2 processing occurs 630. However, if the ATM cell does contain a partial packet 640, then CID of the following partial packet is compared with the CID of the current packet 650. A determination is made as to whether the CIDs match 660. IF the CIDs match 662, then the packets are assembled accordingly and the packets are sent to the user's SCSS layer 680. If the CIDs do not match 664, the partial packets are discarded or they are sent to corresponding users 670.

In summary, a method is provided for preventing misconcatenation of partial packets in AAL2. A CID is added to packets that are split across boundaries. These changes result in minimal modifications in the AAL2 algorithm.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for preventing misconcatenation of partial packets, the partial packets comprising a first partial packet in a first asynchronous transfer mode ATM cell and a remainder partial packet in a subsequent ATM cell, the method comprising the steps of:

determining whether each packet will be divided into the first partial packet and the remainder partial packet at an ATM cell boundary;

adding a channel identifier CID at the beginning of each remainder partial packet;

assembling the first and remainder partial packets into ATM cells;

transmitting the ATM cells;

receiving the ATM cells;

verifying whether the first partial packet and the remainder partial packet in the received ATM cells have the same CID; and assembling the first partial packet and the remainder partial packet into a single packet when the CIDs match.

2. The method of claim 1 further comprising the step of discarding the first and remainder partial packets when the CIDs do not match.

3. The method of claim 1 further comprising the step of sending the first partial packet to a first user identified by the CID for the first partial packet and the remainder partial packet to a second user identified by the CID for the remainder partial packet.

4. The method of claim 1 wherein the CID comprises a one byte code.

5. A method for transmitting asynchronous transfer mode ATM cells that prevents misconcatenation of partial packets, the partial packets comprising a first partial packet in a first ATM cell and a remainder partial packet in a subsequent ATM cell, the method comprising the steps of:

determining whether each packet will be divided into the first partial packet and the remainder partial packet at an ATM cell boundary;

adding a channel identifier CID at the beginning of each remainder partial packet, wherein the CID corresponds to a CID associated with the first partial packet;

assembling the first and remainder partial packets into ATM cells; and transmitting the ATM cells.

6. The method of claim 5 wherein the CID comprises a one byte code.

7. A method for processing asynchronous transfer mode ATM cells received over a network that prevents misconcatenation of partial packets, the partial packets comprising a first partial packet in a first ATM cell and a remainder partial packet in a subsequent ATM cell, the method comprising the steps of:

receiving the ATM cells;

verifying whether the first partial packet and the remainder partial packet in the received ATM cells have matching channel identifiers CIDs; and assembling the first partial packet and the remainder partial packet into a single packet when the CIDs match.

8. The method of claim 7 further comprising the step of discarding the first and remainder partial packets when the CIDs do not match.

9. The method of claim 7 further comprising the step of sending the first partial packet to a first user identified by the CID for the first partial packet and the remainder partial packet to a second user identified by the CID for the remainder partial packet.

10. The method of claim 7 wherein the CID comprises a one byte code.

11. A data structure for ATM cells, comprising:

a header; and a payload assembled to the header, the payload comprising at least one packet, wherein the at least one packet comprises a remainder partial packet comprising a remaining portion of a packet which has a first partial packet residing in a previous ATM cell, wherein the remainder partial packet is provided with a channel identifier code in the ATM cell corresponding to a channel identifier code of the first partial packet in the previous ATM cell, to identify a user for the remainder partial packet.

12. The data structure of claim 11 wherein the channel identifier code comprises a one byte code.

13. The data structure of claim 11 wherein the channel identifier code for the remainder partial packet matches the channel identifier code for the first partial packet from the previous ATM cell.

14. A data structure for an ATM cell, comprising:

a header; and a payload assembled to the header, the payload comprising at least one packet, wherein the at least one packet comprises a remainder partial packet having a channel identifier code attached thereto to identify a user for the remainder partial packet, wherein the channel identifier code for the remainder partial packet matches a channel identifier code for a partial packet from a prior ATM cell, and wherein the remainder partial packet and the partial packet from the prior ATM cell having matching channel identifier codes are reassembled into a single packet for the user identified by the matching channel identifier codes.

\* \* \* \* \*